June 5, 1945. H. I. SIDES ET AL 2,377,815
BASKET CARRYING CART
Filed Nov. 6, 1942 2 Sheets-Sheet 2
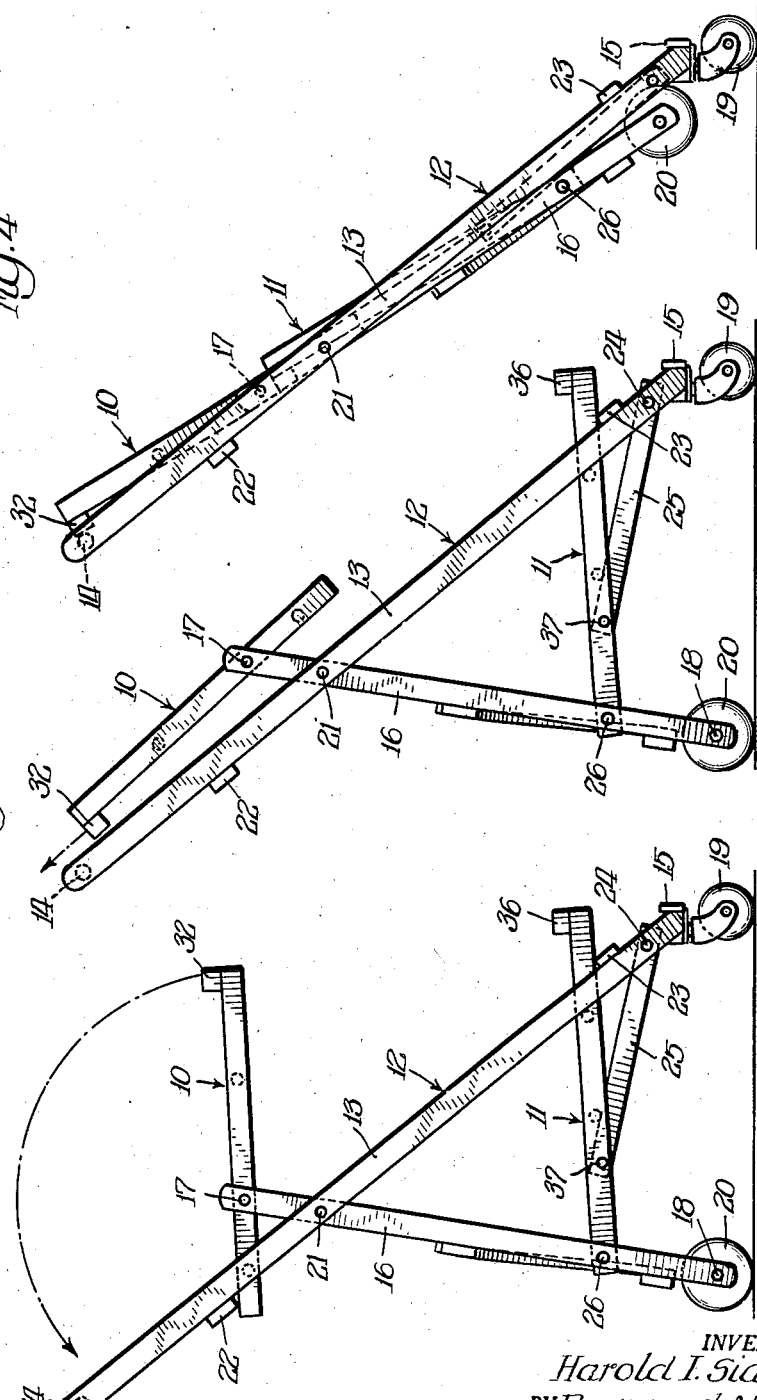
INVENTORS
Harold I. Sides and
BY Raymond M. Sides,
Cromwell Greist + Warden
ATTYS Patented June 5, 1945

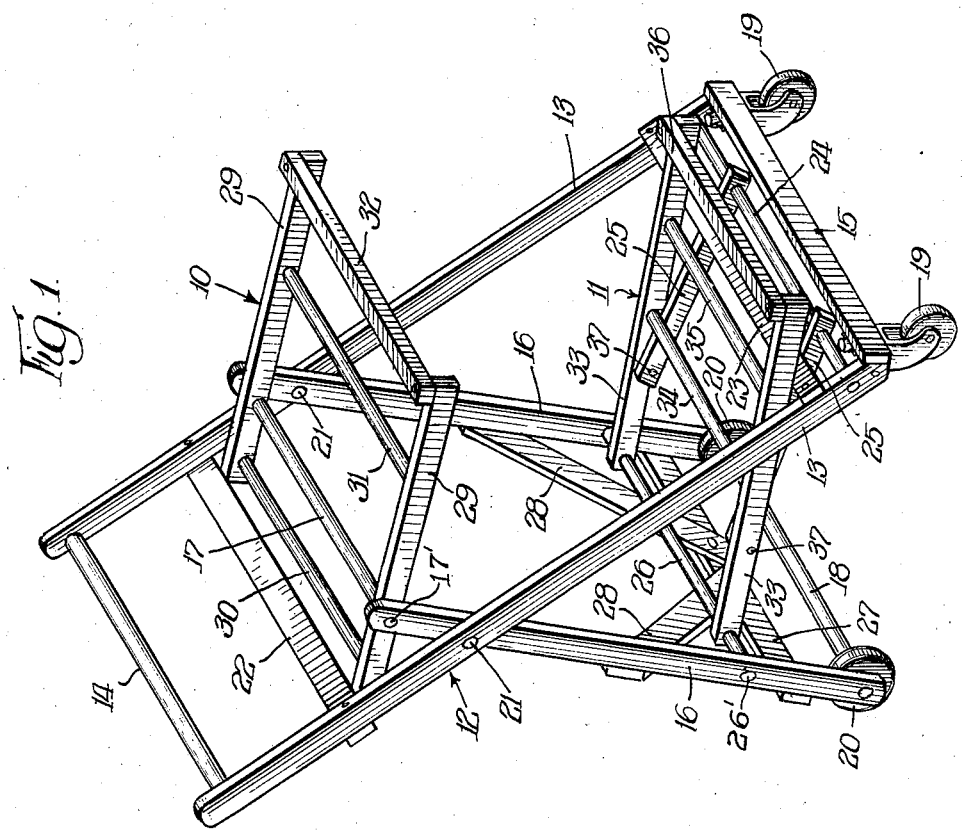

2,377,815

UNITED STATES PATENT OFFICE 2,377,815

BASKET CARRYING CART

Harold I. Sides and Raymond M. Sides,
Chicago, Ill.

Application November 6, 1942, Serial No. 464,712

4 Claims. (Cl. 280—41)

The present invention has to do with basket carrying carts of the type commonly used in self-service stores.

The principal object of the invention is to provide an improved cart of the character described which can be made to collapse instantaneously into a fully flattened out position upon two of the cross members being gripped in a person's hand and squeezed together.

Another important object of the invention is to provide an exceptionally strong and durable cart of substantially all-wood construction.

While the foregoing statements are indicative in a general way of the nature of the invention, other more specific objects and advantages will be apparent to those skilled in the art upon a full understanding of the novel construction of the cart and the easy manner in which the same can be collapsed.

A preferred embodiment of the invention is presented herein by way of exemplification, but it will of course be appreciated that the invention is susceptible of incorporation in other structurally modified forms coming equally within the spirit of the invention and the scope of the appended claims.

In the accompanying drawings:

Fig. 1 is a perspective view of a cart constructed in accordance with the invention;

Fig. 2 is a side view of the cart, showing the cart fully set up;

Fig. 3 is another side view, showing the upper carrier of the cart in an upwardly tilted position, in readiness for the cart to be collapsed; and Fig. 4 is another side view, showing the cart fully collapsed as a result of the two cross members at the top of the cart having been squeezed together.

The cart shown in the drawings is provided with an upper carrier 10 and a lower carrier 11. The carriers 10 and 11 are supported in vertically spaced horizontal positions between the sides of a wheeled frame 12. The frame 12 consists of a pair of long rearwardly and upwardly inclined parallel side bars 13 which are connected together at their upper and lower ends by cross rods 14 and 15, and a pair of relatively short forwardly and upwardly inclined parallel side bars 16 which are connected together at their upper and lower ends by cross rods 17 and 18.

The lower ends of the side bars 13 are located at the lower front corners of the frame 12, while the lower ends of the side bars 16 are located at the lower rear corners of the frame. A pair of caster wheels 19 are mounted on the lower front corners of the frame, in the angles between the lower ends of the side bars 13 and the cross rod 15, and a pair of plain wheels 20 are mounted on the lower rear corners of the frame, on the ends of the cross rod 18. The cross rod 14 which is disposed at the upper ends of the side bars 13 serves as a handle for use in wheeling the cart from one place to another.

The side bars 13 and 16 are pivotally connected together in scissors fashion at the sides of the frame 12 by short pivot pins 21, with the side bars 16 on the inner sides of the side bars 13, and with the upper ends of the side bars 16 extended but a short distance above the pivots 21.

The side bars 13 are additionally connected together by cross rods 22, 23 and 24. The cross rod 22, which is located about midway between the pivots 21 and the upper ends of the side bars 13, serves as a supporting stop for the upper surface of the rear end of the upper carrier 10. The cross rod 23, which is located near the lower ends of the side bars 13, serves as a supporting stop for the under surface of the front end of the lower carrier 11. The cross rod 24, which is located about midway between the cross rod 23 and the lowermost cross rod 15, serves as a pivotal mounting for two toggle links 25 used in tilting up the lower carrier 11.

The side bars 16 are additionally connected together by cross rods 26 and 27. The cross rod 26, which is located near the lower ends of the side bars 16, serves as a pivotal mounting for the rear end of the lower carrier 11. The cross rod 27, which is located below the cross rod 26 at a point just above the wheels 20, provides a mounting for the lower ends of two diagonal braces 28, which braces extend upwardly and outwardly from the center of the cross rod 27 into engagement with the side bars 16 at points about midway between the cross rod 27 and the pivot pins 21.

The upper carrier 10 is a flat rectangular shelf-like structure which is composed of side members 29 and cross members 30, 31 and 32. The side members 29 are positioned horizontally between the upper ends of the side bars 16 of the frame and are pivotally mounted near their rear ends on the ends of the cross rod 17, at 17', with their rear ends underlying the cross rod 22 in engagement with the latter. The cross rod 32 forms the front end of the carrier 10 and also serves as a hand grip portion, for use in conjunction with the hand grip portion 14 in automatically collapsing the cart.

The lower carrier 11 likewise is a flat rectangular shelf-like structure which is composed of side members 33 and cross members 34, 35 and 36. The side members 33 are positioned horizontally, in inwardly spaced relation to the side bars 13 and 16, and are pivotally mounted at their rear ends on the cross rod 26, at 26', with their front ends supported on the cross rod 23. The toggle links 25, which are pivotally connected at their front ends to the cross rod 24, are inclined rearwardly and upwardly into positions on the inner sides of the side members 33 and are pivotally connected at their rear ends to the side members 33 by short pivot pins 37.

To collapse the cart, the upper carrier 10 is first tilted up into the inverted position shown in Fig. 3, in which position the cross rod 32 on the front end of the carrier 10 is disposed within easy finger grip distance of the cross rod 14 on the frame. The two cross rods 14 and 32 are then grasped in the operator's hand and squeezed together, whereupon the entire cart will fully collapse into the flattened out and readily stackable position shown in Fig. 4. To set up the cart again, it is merely necessary to swing the lower carrier 11 downwardly into its horizontal position. This movement of the carrier 11 will cause the side bars 13 and 16 of the frame to open up. The upper carrier 10 may then be swung downwardly into its horizontal position.

If more vertical clearance is needed for the contents of a basket than the spacing between the carriers 10 and 11 provides, the upper carrier 10 may be swung upwardly into an out-of-the-way position whereby to afford unlimited vertical clearance for the contents of a basket placed on the lower carrier 11.

The cart is of all-wood construction—in keeping with the present need of conserving metal for war purposes—but it will of course be understood that the cart can be made of metal if desired at such time as metal is again available. While the cart is exceptionally light, and desirably so, the structural arrangement of the parts makes it very sturdy and well suited for the purpose for which intended.

We claim:

1. In a cart, a pair of relatively long upwardly and rearwardly inclined side bars, a pair of relatively short upwardly and forwardly inclined side bars pivotally connected scissors fashion to the long side bars, supporting wheels adjacent the lower ends of the side bars, a cross rod at the upper ends of the long side bars, which cross rod forms the handle of the cart and also serves as one of two complementary hand-grip portions which upon being squeezed together act to collapse the cart, a lower basket carrying shelf pivotally supported at one end by one of the pairs of side bars, a stop on the other pair of side bars on which the other end of the shelf is supported with the shelf in a substantially horizontal position, toggle links connecting the shelf with the last mentioned side bars for causing the free end of the shelf to swing upwardly into a collapsed position when the short side bars are swung about their pivots into substantially the plane of the long side bars, an upper basket carrying shelf pivotally supported adjacent its rear end by the upper ends of the short side bars, a stop on the long side bars under which the rear end of the upper shelf is engaged with the shelf in a substantially horizontal position, and a cross rod on the front end of the upper shelf, which cross rod is spaced forwardly from the other portions of the upper shelf to leave a hand opening and serves as the other of said hand-grip portions in collapsing the cart, the upper shelf being freely tiltable into an inverted position in which the cross rod on the front end of the same is disposed within convenient one hand gripping distance of the cross rod at the upper ends of the long side bars, said two hand-grip portions upon being gripped from opposite sides and squeezed together acting to draw upwardly and rearwardly the upper forwardly projecting ends of the short side bars and bring about complete collapse of the cart.

2. In a cart, a pair of relatively long upwardly and rearwardly inclined side bars, a pair of relatively short upwardly and forwardly inclined side bars pivotally connected scissors fashion to the long side bars, supporting wheels adjacent the lower ends of the side bars, a cross rod at the upper ends of the long side bars, which cross rod forms the handle of the cart and also serves as one of two complementary hand-grip portions which upon being squeezed together act to collapse the cart, a lower basket carrying shelf pivotally supported at its rear end by the short side bars, a stop on the long side bars on which the front end of the shelf is supported with the shelf in a substantially horizontal position, toggle links connecting the shelf with the long side bars for causing the free front end of the shelf to swing upwardly into a collapsed position when the short side bars are swung about their pivots into substantially the plane of the long side bars, an upper basket carrying shelf pivotally supported adjacent its rear end by the upper ends of the short side bars, a stop on the long side bars under which the rear end of the upper shelf is engaged with the shelf in a substantially horizontal position, and a cross rod on the front end of the upper shelf, which cross rod is spaced forwardly from the other portions of the upper shelf to leave a hand opening and serves as the other of said hand-grip portions in collapsing the cart, the upper shelf being freely tiltable into an inverted position in which the cross rod on the front end of the same is disposed within convenient one hand gripping distance of the cross rod at the upper ends of the long side bars, said two hand-grip portions upon being gripped from opposite sides and squeezed together acting to draw upwardly and rearwardly the upper forwardly projecting ends of the short side bars and bring about complete collapse of the cart.

3. In a collapsible double deck basket carrying cart of the type in which the frame is composed of two pairs of side members which are pivoted together scissors fashion at each side of the frame to permit their being collapsed into a common transverse plane, and in which the basket carrying means includes a lower deck having toggle means for causing the same to buckle up into the same plane as the side members when the latter are collapsed, the provision of a transverse handle at the upper ends of one of the pairs of side members, and a freely tiltable upper deck which is pivoted near its rear end to the upper ends of one of the pairs of side members and is tiltable upwardly into an out-of-the-way position wherein its free front end is within finger grip distance of the handle on the frame, the upper deck being provided with a hand opening immediately to the rear of the free front end of the same and the free front end of the upper deck at the opening and the handle upon both being gripped from opposite sides in a person's hand and squeezed together after the upper deck has been tilted up causing complete collapse of the frame and lower deck into the tilted up plane of the upper deck.

4. In a cart, a pair of relatively long upwardly and rearwardly inclined side bars, a pair of relatively short side bars pivotally connected scissors fashion to the long side bars, a cross rod at the upper ends of the long side bars, which cross rod forms the handle of the cart and also serves as a hand-grip portion in collapsing the cart, a lower basket carrying shelf supported by the two pairs of side bars in a substantially horizontal position, means for causing the shelf to move into a collapsed position when the short side bars are swung about their pivots into substantially the plane of the long side bars, an upper basket carrying shelf pivotally supported by the upper ends of the short side bars, a stop on the long side bars under which the shelf is engaged, with the shelf in a substantially horizontal position, and a cross rod on the front end of the upper shelf, which cross rod is spaced forwardly from the other portions of the upper shelf to leave a hand opening and serves as one of two complementary hand grip portions which upon being squeezed together act to collapse the cart, the upper shelf being separately tiltable into a position in which the cross rod on the front end of the same is disposed within convenient one hand gripping distance of the cross rod at the upper ends of the long side bars, said two hand-grip portions upon being gripped from opposite sides and squeezed together acting to draw upwardly and rearwardly the upper ends of the short side bars and bring about complete collapse of the cart.

HAROLD I. SIDES.
RAYMOND M. SIDES.